June 16, 1953     E. PIETZ     2,642,252
SHOCK MOUNT
Filed March 12, 1946
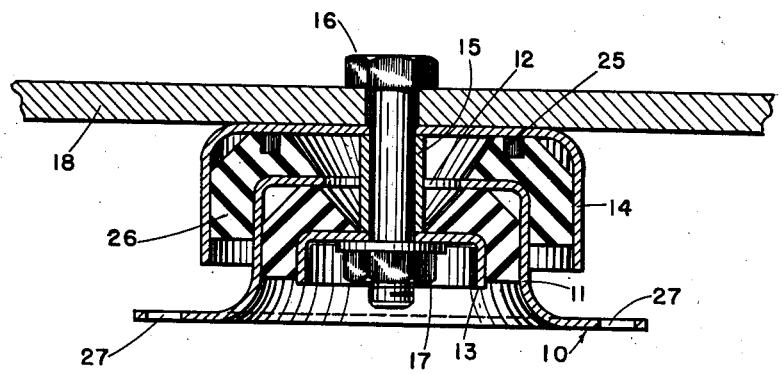
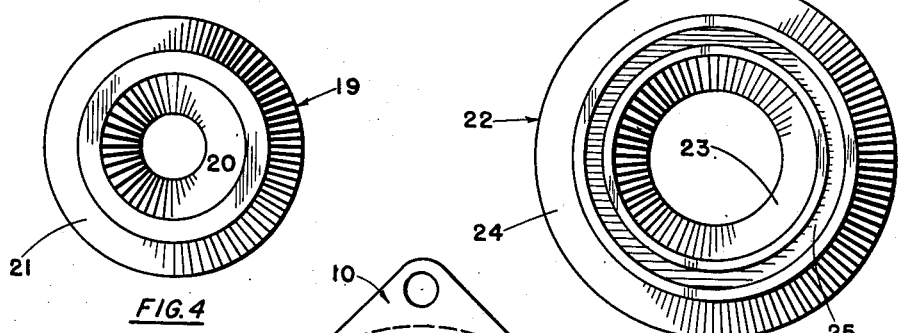
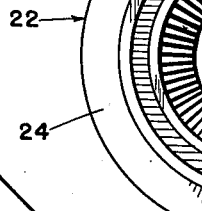
Inventor
ERVIN PIETZ
By M. A. Hayes
Attorney Patented June 16, 1953

2,642,252

UNITED STATES PATENT OFFICE 2,642,252

SHOCK MOUNT

Ervin Pietz, Cambridge, Mass., assignor, by mesne assignments, to the United States of America as represented by the Secretary of the Navy Application March 12, 1946, Serial No. 653,906

2 Claims. (Cl. 248—358)

This invention relates to resilient mountings and more particularly to a new and improved vibration and shock absorbing mounting.

In order properly to support devices for use and yet isolate them from destructive vibrations and shocks as in aircraft, automobiles, and other installations, there have heretofore been employed resilient mountings, including a resilient or yieldable material, such as rubber, which were used to dampen the shocks and vibrations otherwise transmitted to the device being supported. In the proper design of such resilient mountings a number of important factors must be given consideration. It has been found that by precompressing the resilient material and confining it in an approved manner with certain provisions being made for the displacement of the material under stress, i. e., bulge volume, that new and improved results may be obtained.

It is, therefore, an object of the present invention to provide an improved resilient mounting construction wherein the parts and their characteristics are so used as substantially to increase the shock isolating and vibration absorbing characteristics thereof.

Another object of the present invention is to provide a new and improved shock mount design wherein the resilient material is loaded in compression for a force applied in any direction.

Still another object of the invention is to dispose the metal and resilient parts in such a manner that the rubber, regardless of the magnitude of the force on the mount, will always remain between the metal parts. This prevents the impacting of metal against metal during shock.

A further object is to use opposed rubber pads slightly precompressed. This has the desirable effect of maintaining natural frequencies sufficiently high to avoid resonance with the vibration on ships and, at the same time, provides sufficient flexibility to give good shock protection.

A still further object is to provide a mount having equal stiffness in all directions. This is important in shipboard service since shocks are applied from any direction. Furthermore, a mount with substantially equal stiffnesses in all directions makes possible adequate control of natural frequencies.

Another object is to provide a mount which is captive; in other words, the mounted equipment is prevented from becoming a missile in event of failure of the rubber parts.

Further objects and advantages will be apparent from the specification and appended drawings in which latter, Fig. 1 is a vertical sectional elevation of one embodiment of the present invention taken on a line substantially corresponding to line 1—1 of Fig. 2;

Fig. 2 is a bottom plan view of a mount constructed in accordance with the disclosure of Fig. 1;

Fig. 3 is a top plan view of the outer resilient ring member employed in the embodiment illustrated; and Fig. 4 is a top plan view of the inner resilient ring member employed in the embodiment illustrated.

Referring to the drawings in detail:

The embodiment illustrated comprises a support engaging member 10 which may be formed of a single blank as illustrated in Fig. 2 and having a raised central embossment 11 which has a concentric opening therein. An inner cup shaped shell 13 and an outer cup shaped cover 14, are spaced on opposite sides of the embossed portion 11 of the bracket 10 and are of similar configuration to the portion 11. The inner shell 13 and the outer cover 14 may be structurally spaced apart by a tubular sleeve 15 through which a tie bolt 16 extends and may be secured in place by a fastener nut 17. The tie bolt 16 may extend through an instrument support member 18 so as to clamp this member securely to the upper surface of the outer cover 14.

With the arrangement illustrated there is provided a support mount having a pair of annular spaces on opposite sides of the portion 11 of member 10, which spaces may be filled by shaped rings of resilient material, such as rubber, which rings preferably have overhanging sides so that they extend substantially down the side of the upstanding embossment 11 of member 10, as is illustrated in detail in Fig. 1.

The resilient material employed may vary in shape and configuration as circumstances require. However optimum results have been found to be obtained by the use of an inner member 19 (Fig. 4) which has a tapered central face 20 and has a beveled or chamfered outer inclined face 21. An outer resilient member 22 is similarly formed and may have a similarly tapered central face 23 and an outer beveled face 24. If desired, in order to provide a softer more resilient mount there may be provided about the upper surface of the resilient member 22 an annulus 25 concentric with the center of the tie bolt and providing an additional bulge space for the resilient material.

Openings 27 in the corners of the plate 10 may receive bolts or other fastening means to secure the mount to a base or to connect an instrument to the mount.

The horizontal parts of the resilient members 19, 22 resist the vertical forces and are arranged to be slightly compressed when in normal position. The stiffnesses of these resilient members are therefore added, thus increasing the natural frequency of vibration. When a shock is applied, however, the instrument support member 18 is displaced relative to the member 10 and only one of the resilient members 19, 22 is operative. Increased shock protection results from the reduced stiffness provided by the single resilient member.

A particularly novel feature of the invention is the means used to obtain equal stiffness in all directions. This requires substantially equal bearing areas on the resilient material in both horizontal and vertical directions which are not attained with existing designs. For example, in Patent No. 1,912,270 granted to Funk on May 30, 1933, the area of the insulating bushing 35 on the sleeve 34 is of limited extent and results in reduced stiffness in a direction perpendicular to the bolt 1 unless the dimensions of the mount are made unreasonably large. In my invention, I utilize the depending skirt 26 to provide stiffness in the horizontal direction. This skirt has a large diameter and consequently can be made with a horizontal area substantially equal to the area subjected to the vertical loads. The equal stiffness resulting from such an arrangement is very advantageous for applications where equal natural frequencies in all directions are required, such as in the mounting of delicate equipment aboard ship.

While a particular embodiment of the invention is shown, it will be understood, of course, that it is not desired to be limited thereto since many modifications may be made, and it is, therefore, contemplated by the appended claims to cover any such modifications as fall within the true spirit and scope of this invention.

What is claimed is:

1. A resilient mounting comprising a base member having an upstanding central embossment having a cylindrical side wall portion and an upper wall portion extending substantially at a right angle to the cylindrical side wall portion and having a central opening therethrough, inner and outer shells each having a cylindrical side wall portion and an upper wall portion extending substantially at a right angle to the cylindrical side wall portion and having a central opening, said inner shell being disposed within and with its cylindrical wall portion and upper wall portion spaced from those of said central embossment of the base member, said outer shell being disposed without and with its cylindrical wall portion and upper wall portion spaced from those of said central embossment, means for retaining said inner and outer shells in said spaced relationship, and separate inner and outer cup-shaped rings of resilient material positioned respectively between the embossment of the base member and the spaced inner and outer shells, each of said cup-shaped resilient rings having inner and outer cylindrical surfaces and inner and outer surfaces extending substantially at right angles to said cylindrical surfaces, said surfaces of said cup-shaped resilient rings being in engagement respectively with corresponding surfaces of the walls of said embossment and shells, whereby the resilient material of said cup-shaped rings is loaded in compression for force applied in any direction and substantially equal stiffness in all directions is provided, said separate inner and outer cup-shaped resilient rings each having an annular outer conical surface adjacent its periphery providing bulge space respectively within said outer shell and within said embossment, and each resilient ring having a central inner conical surface tapering inwardly of the ring and providing bulge space respectively beneath the upper wall of the outer shell and beneath the upper wall of the said embossment, the outer upper surface of at least one of said resilient rings between its said inner and outer conical surfaces having an annular groove therein extending around the ring, said means for retaining said inner and outer shells in spaced relationship including a spacing sleeve disposed between and engaging said inner and outer shells and extending through said central opening of said central embossment, and securing means extending through the aligned central openings of said inner and outer shells and through said spacing sleeve and adapted to secure said mount to a support member.

2. A resilient mounting comprising a base member having an upstanding central embossment having a cylindrical side wall portion and an upper wall portion extending substantially at a right angle to the cylindrical side wall portion and having a central opening therethrough, inner and outer shells each having a cylindrical side wall portion and an upper wall portion extending substantially at a right angle to the cylindrical side wall portion and having a central opening, said inner shell being disposed within and with its cylindrical wall portion and upper wall portion spaced from those of said central embossment of the base member, said outer shell being disposed without and with its cylindrical wall portion and upper wall portion spaced from those of said central embossment, means for retaining said inner and outer shells in said spaced relationship, and separate inner and outer cup-shaped rings of resilient material positioned respectively between the embossment of the base member and the spaced inner and outer shells, each of said cup-shaped resilient rings having inner and outer cylindrical surfaces and inner and outer surfaces extending substantially at right angles to said cylindrical surfaces, said surfaces of said cup-shaped resilient rings being in engagement respectively with corresponding surfaces of the walls of said embossment and shells, whereby the resilient material of said cup-shaped rings is loaded in compression for force applied in any direction and substantially equal stiffness in all directions is provided, said separate inner and outer cup-shaped resilient rings each having an annular outer conical surface adjacent its periphery providing bulge space respectively within said outer shell and within said embossment, and each resilient ring having a central inner conical surface tapering inwardly of the ring and providing bulge space respectively beneath the upper wall of the outer shell and beneath the upper wall of the said embossment, said means for retaining said inner and outer shells in spaced relationship including a spacing sleeve disposed between and engaging said inner and outer shells and extending through said central opening of said central embossment, and securing means extending through the aligned central openings of said inner and outer shells and through said spacing sleeve and adapted to secure said mount to a support member.

ERVIN PIETZ.

References Cited in the file of this patent

UNITED STATES PATENTS

| Number | Name | Date |
|---|---|---|
| 1,728,871 | Masury | Sept. 17, 1929 |
| 1,892,065 | Markey | Dec. 27, 1932 |
| 2,018,860 | Lord | Oct. 29, 1935 |
| 2,022,102 | Anibal | Nov. 26, 1935 |
| 2,256,752 | Saurer | Sept. 23, 1941 |
| 2,271,016 | Julien | Jan. 27, 1942 |
| 2,352,049 | Weaver | June 20, 1944 |
| 2,386,463 | Hile | Oct. 9, 1945 |
| 2,399,414 | Wells et al. | Apr. 30, 1946 |
| 2,406,601 | Fyler | Aug. 27, 1946 |

FOREIGN PATENTS

| Number | Country | Date |
|---|---|---|
| 418,781 | Great Britain | Oct. 13, 1934 |